United States Patent [19]

Camp et al.

[11] Patent Number: 4,980,181
[45] Date of Patent: Dec. 25, 1990

[54] CHOCOLATE COATED BEVERAGE MIXES

[75] Inventors: William F. Camp; Eugene R. Fischbach, both of Fulton, N.Y.

[73] Assignee: Nestec S. A., Vevey, Switzerland

[21] Appl. No.: 295,818

[22] Filed: Jan. 11, 1989

[51] Int. Cl.⁵ .................................................. A23P 1/08
[52] U.S. Cl. ...................................... 426/98; 426/273; 426/285; 426/306; 426/593
[58] Field of Search ............... 426/590, 591, 593, 285, 426/96, 99, 273, 306, 98, 631

[56] References Cited

U.S. PATENT DOCUMENTS

| | | | |
|---|---|---|---|
| 3,006,763 | 10/1961 | Marcy | 426/285 |
| 3,028,242 | 4/1962 | Hale | 426/285 |
| 3,238,045 | 3/1966 | Damisch | 426/285 |
| 3,385,710 | 5/1968 | Reymond | 426/96 |
| 3,796,814 | 3/1974 | Cermak | 426/285 |
| 4,308,288 | 12/1981 | Hara | 426/285 |
| 4,594,258 | 6/1986 | Vitti | 426/285 |
| 4,925,683 | 5/1990 | Fischbach | 426/103 |

*Primary Examiner*—Carolyn Paden
*Attorney, Agent, or Firm*—Vogt & O'Donnell

[57] ABSTRACT

A composition for preparation of a beverage in which agglomerates of a beverage base are coated with chocolate.

12 Claims, No Drawings

CHOCOLATE COATED BEVERAGE MIXES

BACKGROUND OF THE INVENTION

The present invention relates to beverage mixes, more particularly to beverage mixes in which beverage base agglomerates are coated with a thin layer of a fat-based confectionery coating.

There is a desire for beverage mixes, which are to be mixed with hot milk or water for consumption, which contain real chocolate.

Beverage mixes are known in which a small amount of chocolate powder is mixed with a beverage powder such as cocoa, but these products suffer from the disadvantages that the presence of chocolate is not self-evident before dissolution or if larger pieces of chocolate are used, the melting and distribution of chocolate throughout the drink is not as rapid as may be desired.

We have devised a method of preparing beverage mixes which comprises spraying a fat based confectionery coating onto beverage mix agglomerates as a thin layer. When the fat-based confectionery material is chocolate, not only is the presence of real chocolate self-evident before dissolution but the melting and distribution of the chocolate throughout the drink is extremely rapid.

Accordingly, the present invention provides a beverage mix in which beverage base agglomerates are coated with a thin layer of a fat-based confectionery material.

The present invention also provides a process for preparing a beverage mix which comprises applying a fat-based confectionery material onto agglomerates of a beverage base.

DETAILED DESCRIPTION OF THE INVENTION

The beverage base employed in the present invention may be for example, cocoa, hot cocoa mix, coffee or a mixture of skim milk powder and sugar. The agglomerates may advantageously be made by any suitable method, e.g., free-fall, spray drying, spray cooling or in a fluidised bed. One convenient method involves atomising water in a fluidised bed at a temperature of, for instance, 30° C. to 50° C. The agglomerates made are generally of irregular shape and have a low density.

The agglomerates of the beverage base conveniently have a particle size of from 10 to 40 mesh (U.S. Standard), i.e., the average diameter of the particles is from 0.4 mm to 2.0 mm, and preferably from 0.6 mm to 1.0 mm.

The fat-based confectionery coating may be any kind of confectionery material with fat as the continuous phase, for example, milk or dark chocolate or compound coatings containing non-cocoa butter vegetable fats or various substitutes such as direct cocoa butter replacements, stearines, coconut oil, palm oil, butter or any mixture thereof.

The fat-based confectionery material should be in a fluidised state, e.g., molten for application onto the agglomerates of a beverage base to form a coating and it is conveniently adjusted for viscosity and hardening properties, i.e., it has an appropriate viscosity at certain specified temperature so that it is pumpable and will harden at a suitable stage after application to the agglomerates. The application of the fat-based confectionery material to the agglomerates of a beverage base is advantageously achieved by spraying.

Conveniently, the fat-based confectionery material in the molten state is broken down into particles of a size sufficiently small for coating, for example by atomising, and sprayed on to the agglomerates of the beverage base, conveniently in a fluidised bed, at a temperature of, for instance, from 20° to 60° C. Alternatively, the fat-based confectionery material may be dispensed in drops onto the agglomerates and coated in conventional coating equipment.

The amount of fat-based confectionery coating may be, for instance, from 2.5 to 50% by weight and preferably from 5 to 25% by weight based on the total weight of the beverage mix. Generally, longer application times give a higher uptake.

Advantageously, the agglomeration of the beverage base and the application of the fat-based confectionery material are carried out in the same piece of equipment.

If desired, various flavours may be added either to the beverage base or to the coating material. Water soluble flavours may be added to the beverage base and oil soluble flavours may be added to the fat-based coating. Examples of flavours that may be added include mint, cherry, malt, orange and cinnamon.

The beverage mix prepared by the process of the present invention may be prepared for consumption by mixing with a hot liquid. Although the temperature of the hot liquid may be from 40° C. to 100° C. it is preferable that the temperature is at least 75° C. Any consumable liquid that can be safely heated to at least 75° C. can be used as the liquid medium, for example, coffee or tea, but milk or water are most appropriate. A convenient method of preparing the beverage mix for consumption is by adding an appropriate quantity of the beverage mix to cold liquid and then putting in a microwave oven at full power for about 1.5 minutes.

The beverage mix according to this invention provides a unique means of showing that a beverage product contains real chocolate and in which the chocolate is melted and distributed rapidly throughout the drink.

EXAMPLES

The following Examples further illustrate the present invention.

EXAMPLE 1

Hot Cocoa Mix agglomerates (approximately 20 mesh particle size) were made by atomising with water in a fluidised bed at 40° C. Then, adjusted milk chocolate at 0° C. was poured into a 30 cc plastic syringe. The coating was applied over a period of 2 minutes onto the tumbling particles of agglomerates by generating a spray of molten chocolate using compressed air in an atomising nozzle. The mix was heated to 60° C. during addition of the chocolate and then cooled while still fluidised to harden the chocolate onto the Hot Cocoa Mix agglomerate surfaces. The amount of milk chocolate coating was of average 7% by weight based on the total weight of the mix.

Two teaspoonfuls of this beverage mix were added to 20 grams of hot milk in which the agglomerates rapidly dispersed to give a tasty drink.

EXAMPLE 2

A similar procedure to that described in Example 1 was followed except that the spraying of the molten chocolate took place over a longer period of 7 minutes so that the amount of milk chocolate coating was on average 20% by weight based on the total weight of the mix.

EXAMPLE 3

A similar procedure to that described in Example 1 was followed except that instead of cocoa mix, a mixture of skim milk powder and sugar containing 66% skim milk powder was agglomerated and, instead of milk chocolate, dark chocolate was coated onto the agglomerates to give a product consisting of 22% dark chocolate, 31% skim milk powder and 47% sugar.

We claim:

1. A composition for preparation of a beverage comprising agglomerates of a beverage base selected from a group of beverage bases consisting of agglomerates of cocoa, hot cocoa mix, coffee and a mixture of skim milk powder and sugar coated with chocolate.

2. A composition according to claim 1 wherein the agglomerates of the beverage base have a particle size of from 10 to 40 mesh.

3. A composition according to claim 1 wherein the chocolate is selected from a group consisting of milk chocolate and dark chocolate.

4. A composition according to claim 1 wherein the chocolate coating is in an amount of from 2.5% to 50% by weight based upon a total weight of the composition.

5. A process for preparing a composition for preparation of a beverage comprising:
   preparing agglomerates of a beverage base;
   tumbling the agglomerates in a fluidized bed at a temperature of from 20° C. to 60° C.;
   atomizing and spraying molten chocolate onto the tumbling agglomerates; and
   tumbling and cooling the chocolate coated agglomerates to harden the chocolate.

6. A process according to claim 5 wherein the beverage base is selected from the group of beverage bases consisting of cocoa, hot cocoa mix, coffee and a mixture of skim milk powder and sugar.

7. A process according to claim 6 wherein the chocolate is selected from the group consisting of milk chocolate and dark chocolate.

8. A product of the process of claim 6.

9. A product of the process of claim 7.

10. A process according to claim 5 wherein the beverage base agglomerates have a particle size of from 10 to 40 mesh and chocolate is sprayed onto the agglomerates for obtaining chocolate coated agglomerates having an amount of chocolate of from 2.5% to 50% by weight based upon a total weight of the composition.

11. A product of the process of claim 10.

12. A composition for preparation of a beverage comprising agglomerates of a beverage base selected from a group of beverage bases consisting of agglomerates of cocoa, hot cocoa mix, coffee and a mixture of skim milk powder and sugar coated with chocolate selected from a group of chocolates consisting of milk chocolate and dark chocolate.

* * * * *

UNITED STATES PATENT AND TRADEMARK OFFICE
CERTIFICATE OF CORRECTION

PATENT NO. : 4,980,181

DATED : December 25, 1990

INVENTOR(S) : William F. CAMP, et al.

It is certified that error appears in the above-identified patent and that said Letters Patent is hereby corrected as shown below:

Column 1, line 62, after "molten" insert a comma.

Column 4, line 18 (line 3 of claim 10), after "and" insert --the--.

Signed and Sealed this

Twenty-first Day of April, 1992

Attest:

HARRY F. MANBECK, JR.

*Attesting Officer*      *Commissioner of Patents and Trademarks*